US007062050B1

(12) United States Patent
Pompei

(10) Patent No.: US 7,062,050 B1
(45) Date of Patent: Jun. 13, 2006

(54) PREPROCESSING METHOD FOR NONLINEAR ACOUSTIC SYSTEM

(76) Inventor: Frank Joseph Pompei, 16 Peck Ave., Wayland, MA (US) 01778

( * ) Notice: Subject to any disclaimer, the term of this patent is extended or adjusted under 35 U.S.C. 154(b) by 689 days.

(21) Appl. No.: 09/794,193

(22) Filed: Feb. 27, 2001

Related U.S. Application Data

(60) Provisional application No. 60/185,245, filed on Feb. 28, 2000.

(51) Int. Cl.
*H04B 3/00* (2006.01)

(52) U.S. Cl. .......................................................... 381/77

(58) Field of Classification Search .................. 381/77, 381/98, 103, 79
See application file for complete search history.

(56) References Cited

U.S. PATENT DOCUMENTS 6,584,205 B1 * 6/2003 Croft et al. .................... 381/98

OTHER PUBLICATIONS

*Improved efficiency in the parametric transmitting array*, Harold M. Merklinger, J. Acoustical Society of America, vol. 53, No. 4, Oct. 1975, pp. 784-787.

*Partametric Loudspeaker-Characteristics of Acoustic Field and Suitable Modulation of Carrier Ultrasound*, Kenichi Aoki, et al., Electronics and Communications in Japan, Part 3, vol. 74, No. 9, 1991, pp. 76-82.

* cited by examiner

*Primary Examiner*—Brian Pendleton
(74) *Attorney, Agent, or Firm*—Weingarten, Schurgin, Gagnebin & Lebovici LLP

(57) ABSTRACT

A method of processing an audio signal in a nonlinear acoustic system to reduce distortion in corresponding regenerated audio signals. A first nonlinear processing method includes producing a modeled representation of signal demodulation through a propagation medium, applying an inversion to the modeled representation of signal demodulation, and processing an audio signal using the inverted, modeled signal demodulation representation. A second nonlinear processing method includes applying an inversion to a signal demodulation function, producing a modeled representation of the inverted signal demodulation function, and processing an audio signal using the modeled representation of the inverted signal demodulation function. The processed audio signal is then modulated using an ultrasonic carrier signal, and projected through a propagation medium using an acoustic transducer.

11 Claims, 4 Drawing Sheets

PREPROCESSING METHOD FOR NONLINEAR ACOUSTIC SYSTEM

CROSS REFERENCE TO RELATED APPLICATIONS

This application claims priority of U.S. Provisional Patent Application No. 60/185,245 filed Feb. 28, 2000 entitled PREPROCESSING METHOD FOR NONLINEAR ACOUSTIC SYSTEM.

STATEMENT REGARDING FEDERALLY SPONSORED RESEARCH OR DEVELOPMENT

N/A

BACKGROUND OF THE INVENTION

The present invention relates generally to nonlinear acoustic systems that utilize the non-linearity of a propagation medium for signal demodulation, and more specifically to a method of processing signals in a nonlinear acoustic system to reduce distortion in resulting demodulated signals.

Nonlinear acoustic systems are known that employ an acoustic transducer for projecting an ultrasonic carrier signal modulated with a processed audio signal through the air for subsequent regeneration of the audio signal along a path of projection. Such nonlinear acoustic systems typically include a modulator for modulating an ultrasonic carrier signal with a processed audio signal, a driver amplifier for amplifying the modulated carrier signal, and at least one acoustic transducer for directing the ultrasonic signal through the air along a selected projection path. Because of the nonlinear propagation characteristics of the air, the projected ultrasonic signal is demodulated as it passes through the air, thereby regenerating the audio signal along the selected projection path.

One drawback of typical nonlinear acoustic systems is that the regenerated audio signals frequently contain significant levels of distortion.

An approach to reducing distortion levels in such regenerated audio signals is described in a publication entitled *Parametric Loudspeaker—Characteristics of Acoustic Field and Suitable Modulation of Carrier Ultrasound*, Aoki et al., Electronics and Communications in Japan, Part 3, Vol. 74, No. 9, 1991. According to that publication, an audible signal level generated by the nonlinear acoustic process is approximately proportional to the square of the modulation envelope for low levels of the ultrasonic signal, and approximately proportional to the modulation envelope itself for high levels of the ultrasonic signal. In order to invert the distortion that would normally result in the audible signal, Aoki et al. employ a processing method that combines taking the square root of the audio signal and multiplying the audio signal by an empirically determined constant before modulation.

Although the approach of Aoki et al. reduces distortion for specific ultrasonic output levels, this approach has drawbacks in that it generally does not reduce distortion over a full output level range of the ultrasonic signal.

It would therefore be desirable to have a nonlinear acoustic system that can be used to regenerate audible signals with reduced distortion. Such a system would reduce distortion in regenerated audio signals over a full practical range of ultrasonic output levels.

BRIEF SUMMARY OF THE INVENTION

A method of processing audio signals in a nonlinear acoustic system to reduce distortion in corresponding regenerated audio signals is provided. In a first embodiment, the processing method includes producing a modeled representation of signal demodulation through a propagation medium, applying an inversion to the modeled representation of signal demodulation, and processing an audio signal using the inverted modeled representation of signal demodulation. The processed audio signal is then modulated using an ultrasonic carrier signal, and projected through the propagation medium using an acoustic transducer.

In a second embodiment, the processing method includes applying an inversion to a signal demodulation function, producing a modeled representation of the inverted signal demodulation function, and processing an audio signal using the modeled representation of the inverted signal demodulation function. The processed audio signal is then modulated using an ultrasonic carrier signal, and projected through a propagation medium using an acoustic transducer.

By processing audio signals using the modeled representations of the first and second embodiments, an advantage in the form of reduced distortion in the corresponding regenerated audio signals over a full practical range of ultrasonic output levels is achieved.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

U.S. Provisional Patent Application No. 60/185,245 filed Feb. 28, 2000 is incorporated herein by reference.

A system is disclosed for directing an ultrasonic signal modulated with an audio signal through a propagation medium such as air for subsequent regeneration of the audio signal along a selected projection path. The presently disclosed system implements a method of processing the audio signal to reduce distortion in the regenerated audio signal over a full practical range of the ultrasonic output level.

Figure 1:
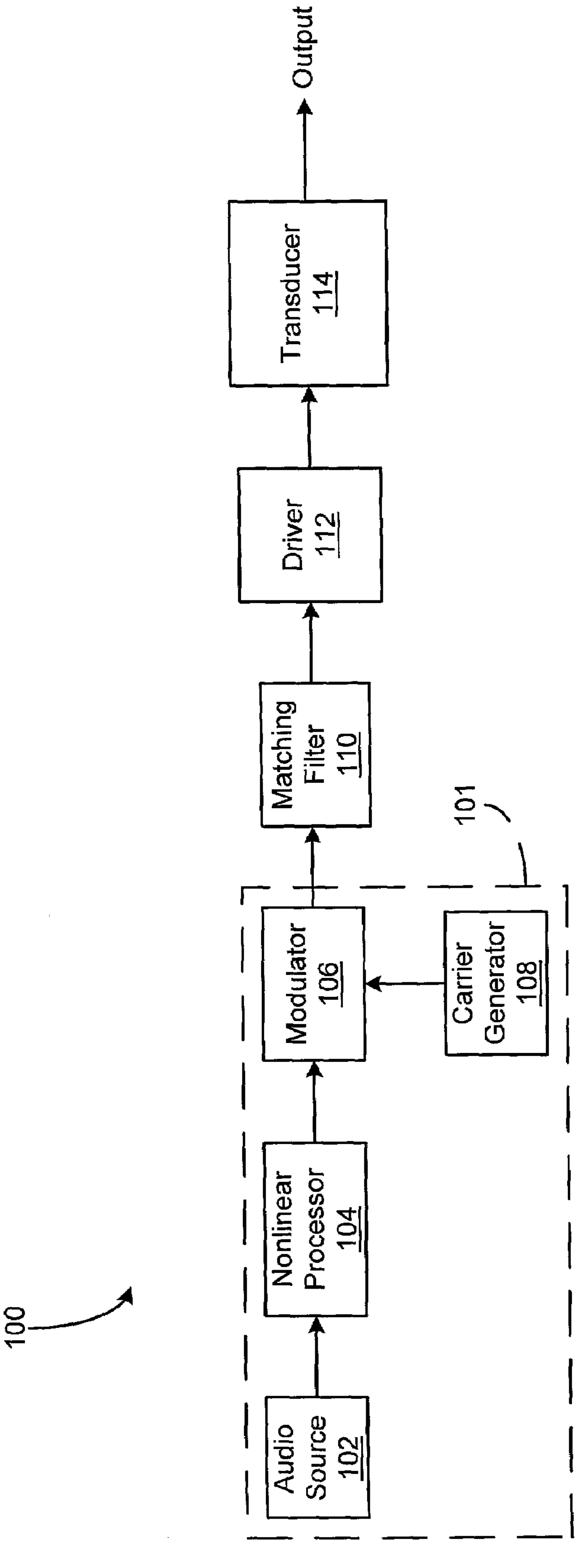
FIG. 1 is a block diagram illustrating a nonlinear acoustic system according to the present invention.

FIG. 1 depicts a block diagram of an illustrative embodiment of a nonlinear acoustic system 100 in accordance with the present invention. In the illustrated embodiment, the nonlinear acoustic system 100 includes an acoustic transducer 114 driven by a signal generator 101, which includes an audio signal source 102, nonlinear processing circuitry 104, a modulator 106, and an ultrasonic carrier signal generator 108. The general structure and operation of such a nonlinear acoustic system is described in co-pending U.S. patent application Ser. No. 09/758,606 filed Jan. 11, 2001 entitled PARAMETRIC AUDIO SYSTEM, which is incorporated herein by reference.

The nonlinear processing circuitry 104 receives an audio signal generated by the audio signal source 102, processes the audio signal, and provides the processed audio signal to the modulator 106. In a preferred embodiment, the nonlinear processing circuitry 104 is configured to perform a nonlinear inversion to reduce distortion in a resulting demodulated signal. It is noted that appropriate processing of the audio signal may be performed either before or after modulating the audio signal. The nonlinear processing circuitry 104 and the processing method implemented thereby are discussed in detail below.

The modulator 106 receives the processed audio signal from the nonlinear processing circuitry 104 and an ultrasonic carrier signal from the ultrasonic carrier signal generator 108, and modulates the ultrasonic carrier signal with the processed audio signal. In a preferred embodiment, the modulator 106 is configured to perform amplitude modulation by multiplying the processed audio signal with the ultrasonic carrier signal. It is noted, however, that because the ultimate goal of such modulation is to convert audio-band signals into ultrasound, any modulation method that achieves that result may be used.

The modulator 106 provides the modulated signal to an optional matching filter 110, which in turn provides a filtered, modulated signal to a driver amplifier 112. The matching filter 110 is configured to compensate for the generally non-flat frequency response of the driver amplifier 112 and the acoustic transducer 114. The driver amplifier 112 provides an amplified version of the filtered and modulated signal to the acoustic transducer 114, which projects a corresponding ultrasonic beam through the air. In a preferred embodiment, the acoustic transducer 114 comprises a membrane-type transducer. The ultrasonic beam, which comprises the ultrasonic carrier signal modulated with the audio signal, is demodulated upon passage through the air because of the nonlinear propagation characteristics of the air, thereby regenerating audible sound.

The demodulation of the ultrasonic beam to regenerate the audio signal, and the processing of the audio signal to reduce distortion in the regenerated audio signal, will be better understood with reference to the following analysis. In this analysis, it is understood that the ultrasonic beam has a radius "R" and a corresponding source equation expressed as $$p_1(t,0)=p_0 f(t)\sin\omega t, \tag{1}$$

in which "f(t)" is the modulation envelope (which is understood to be normalized), "$p_0$" is the primary ultrasonic intensity, and "ω" is the carrier frequency.

Those of ordinary skill in the art will appreciate that a resulting far-field, axial, demodulated waveform may be expressed as $$p_2(\tau, z) = \frac{R^2 p_0}{4\omega c_0 z}\frac{\partial^2}{\partial\tau^2}\left[f(\tau)\tan^{-1}\left(\frac{\beta\omega p_0 f(\tau)}{4\alpha\rho_0 c_0^3}\right)\right], \tag{2}$$

in which "z" is the axial distance, "β" is the nonlinear parameter, "$c_0$" is the speed of sound, "$\rho_0$" is the density of the medium, $$\text{“}\tau = t - \frac{z}{c_0}\text{”}$$

is the lag-time, and "α" is the absorption coefficient.

At a fixed position "z", the demodulation function (2) may be expressed as $$p_2(t) = \frac{Q_0}{\omega}\frac{\partial^2}{\partial t^2}[f(t)\tan^{-1}(Q_1\omega f(t))], \tag{3}$$

in which "$Q_0$" and "$Q_1$" are both constants. It is noted that "$Q_0$" and "$Q_1$" may be adjusted to account for listener range, qualities of the propagation medium (e.g., temperature and/or pressure), or other factors.

According to the present invention, an appropriate function "f(t)" is synthesized such that after modulation, the ultrasonic beam will demodulate into the desired low-frequency signal "$p_2$" (τ) via ultrasonic demodulation.

In this analysis, the second derivative in equation (3) is removed by integrating twice, which may be achieved by applying equalization to the low-frequency signal. It is noted that the low-frequency signal may also be applied to a high pass filter to prevent the acoustic transducer 114 from expending energy by attempting to reproduce low-frequency components. Other signal conditioning and equalization may also be used.

As a result, equation (3) may be expressed as $$g(t) \propto \int\int p_2(t)dt^2 = \frac{Q_0}{\omega}f(\tau)\tan^{-1}(Q_1\omega f(\tau)) + k_1\tau + k_2, \tag{4}$$

in which "$k_1$" and "$k_2$" are both integration constants. It is noted that an appropriate offset value may be provided to prevent over-modulation. Alternatively, a generalized offset operator "L(t)" may be provided, in which "L(t)" may comprise a constant, a ramp function, or a slow-moving envelope follower proportional to the amplitude of the incoming signal. For example, "L(t)" may have an asymmetric time response, i.e., a fast attack and slow decay, to move the resulting distortion to low frequencies while preventing over-modulation.

In this analysis, it is understood that the signals are properly normalized such that $|g(t)|\leqq 1$.

In the event that $Q_1\omega \ll 1$, the demodulation function of equation (4) may be expressed as $$g(t) \propto Q_1 f^2(t) - L(t). \tag{5}$$

For this case, an appropriate function "f(t)" may be expressed as $$f(t)=(L(t)+g(t))^{1/2}. \tag{6}$$

In the event that $Q_1\omega >> 1$, the demodulation function of equation (4) may be expressed as $$g(t) \propto Q_1 \frac{\pi}{2} |f(x)| - L(t). \quad (7)$$

For this alternative case, an appropriate function "f(t)" may be expressed as $$f(t) = L(t) + g(t). \quad (8)$$

For modest carrier frequencies and ultrasonic amplitudes, "$Q_1\omega$" is typically small and the approximation given by equation (5) is accurate. However, when using high carrier frequencies (e.g., $\omega > 2\pi \cdot 100$ kHz) and/or high intensities (e.g., $p_0 > 1000$ Pa in air), the approximation of equation (5) is no longer valid and the approximation given by equation (7) becomes more accurate. It is noted that practical limitations generally prevent operation of nonlinear acoustic systems in such extreme regions where the ultrasonic output level is greater than 1000 Pa (in air), which corresponds to about 155 dB.

Figure 2:
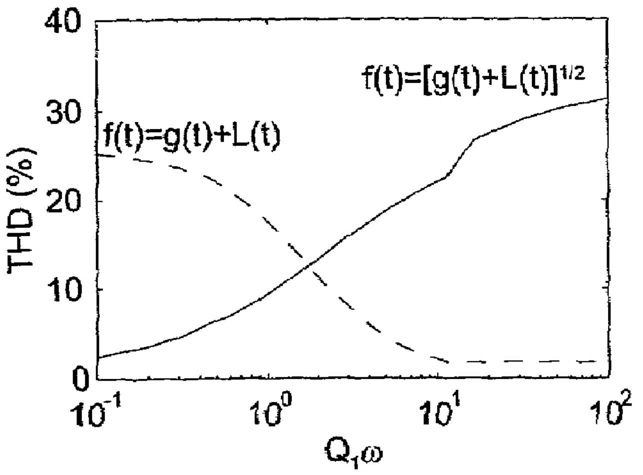
FIG. 2 is a graph illustrating total harmonic distortion of a synthesized 1 kHz tone after demodulation for two (2) representative modulation envelopes.

FIG. 2 depicts the simulated Total Harmonic Distortion (THD) for respective modulation envelopes, f(t), as expressed in equations (6) and (8). It is understood that appropriate processing is provided to achieve the respective modulation envelopes of equations (6) and (8). It is further understood that FIG. 2 depicts the simulated THD of a synthesized 1 kHz tone after demodulation for each processing method.

For several ultrasonic signal levels, the synthesized tone is first processed using appropriate algorithms corresponding to equations (6) and (8), and then "demodulated" using the full demodulation function, as expressed by equation (4). The estimated THD (as calculated from the first three (3) harmonics) versus the ultrasonic signal level for each processing method is then plotted, as depicted in FIG. 2.

As shown in FIG. 2, the THD corresponding to the modulation envelope, f(t), of equation (6) is relatively low for low ultrasonic signal levels and carrier frequencies, and relatively high for high ultrasonic signal levels and carrier frequencies. In contrast, the THD corresponding to the modulation envelope, f(t), of equation (8) is relatively high for low ultrasonic signal levels and carrier frequencies, and relatively low for high ultrasonic signal levels and carrier frequencies. Accordingly, these processing methods are valid only for certain extreme values of ultrasonic signal levels and carrier frequencies.

According to the present invention, a nonlinear processing method is provided that results in low THD over a full practical range of ultrasonic signal levels. In a first embodiment, a modeled representation of a demodulation function is provided over a full practical range of ultrasonic signal levels, and an inversion is applied to the modeled representation of the demodulation function to arrive at the nonlinear processing method.

Specifically, equation (4) is expressed as $$g(t) = \gamma h(t) \tan^{-1} h(t) - L(t), \quad (9)$$

in which $$\text{“}\gamma = \frac{Q_0}{Q_1 \omega^2}\text{”}$$

and "$h(t) = Q_1\omega f(t)$". Next, a modeled representation of equation (9) is provided over a wide range of "h(t)".

For example, equation (9) may be modeled using a set of piece-wise quadratic polynomials, which may be generated by way of least-squares error minimization. Specifically, the modeled representation of equation (9) may be expressed as $$\gamma^{-1}[g(t) + L(t)] = \begin{cases} h^2(t), & h(t) \le \frac{\pi}{8} \\ 0.2863h^2(t) + 0.6767h(t) - 0.1793, & \frac{\pi}{8} < h(t) < \frac{\pi}{2} \\ 0.0012h^2(t) + 1.5487h(t) - 0.9008, & \frac{\pi}{2} < h(t) \le 4\pi \\ 1.56h(t) - 1, & h(t) > 4\pi \end{cases} \quad (10)$$

Figure 3:
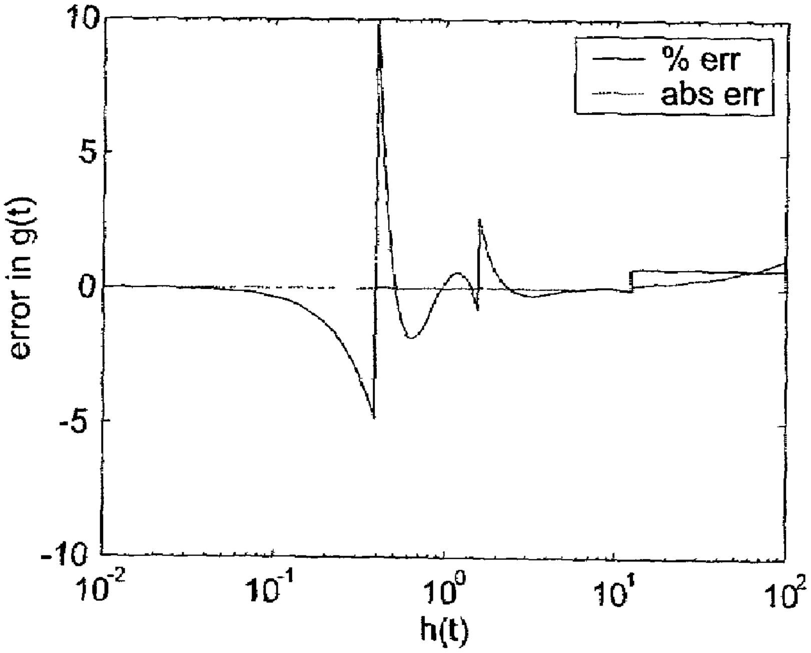
FIG. 3 is a graph illustrating absolute and relative (%) error corresponding to a modeled representation of a signal demodulation function according to the present invention.

FIG. 3 depicts the absolute and relative (%) error curves corresponding to the modeled representation as expressed by equation (10). Over the interval $0 \leqq h(t) \leqq 100$, FIG. 3 shows that the errors are relatively small. It is noted that discontinuities shown in FIG. 3 are believed to be caused by the transitions between the modeling intervals. If desired, the errors, e.g., the discontinuities, may be reduced by using other curve-fitting methods such as cubic splines, by using additional modeling intervals or longer coefficients, or by overlapping the modeling intervals.

In this first embodiment, the modeled representation of equation (10) is applied as a processing method by inverting each of the equations included therein to generate a set of equations "h(t)" as a function of "g(t)". For example, each of the equations may be inverted using the quadratic equation.

It is noted that equation (4) may be generally expressed as $$x = y \tan^{-1}(\gamma y), \quad (11)$$

in which "γ" is a constant related to the ultrasonic output level, the carrier frequency, and the ultrasonic absorption "x" represents the audio signal (after suitable offset); and, "y" is the nonlinearly compensated (i.e., nonlinearly processed) audio signal. An inversion may then be applied to equation (11) to arrive at the processing method. For example, an inversion of equation (11) may be implemented by way of a lookup table, a polynomial approximation, a piece-wise linear or piece-wise polynomial approximation, or a spline fit. Alternatively, an algorithm representative of equation (11) may be implemented in a feedback circuit.

Alternatively, equation (4) may be expressed as $$x = y \tan h(\gamma y), \quad (12)$$

and an inversion may be applied to equation (12) to arrive at the processing method. It is noted that the inverse of equation (12) is generally easier to implement in analog or digital electronics than equation (11).

In a second embodiment, a modeled representation of an inverted demodulation function is provided to arrive at the processing method. For example, the inverted demodulation function may be calculated numerically (see FIG. 4). Specifically, the curve shown in FIG. 4 is calculated by numerically inverting the expression $$g(t) = \gamma h(t) \tan^{1}[h(t)]. \quad (13)$$

For this case, a segmented quadratic curve fit is employed in various regions of the curve. It is understood that cubic or other approximations may also be used, as well as a lookup table.

Figure 4:
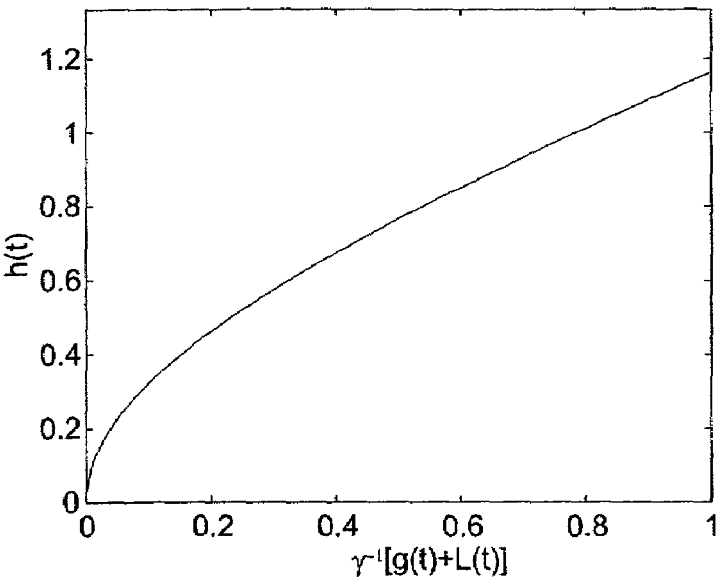
FIG. 4 is a graph illustrating a modeled representation of an inverted signal demodulation function according to the present invention.

As shown in FIG. 4, the curve representing the inversion of equation (13) is modeled as a smooth, continuous curve that transitions from a square root function for small values of g(t), and asymptotically progresses to a linear function for large values of g(t). It is noted that intermediate values of the curve of FIG. 4 are modeled using segmented polynomials, which may be calculated efficiently using a Digital Signal Processor (DSP). For example, the modeled representation of the inversion of equation (13), calculated using a least-squares function fit (with L(t) implicitly included), may be expressed as $$f(t) \propto h(t) \propto \begin{cases} \sqrt{g(t)}, & \gamma^{-1}g(t) < 0.2 \\ 0.6409g^2(t) + 1.5323g(t) + 0.1693, & 0.2 \le \gamma^{-1}g(t) < 0.8 \\ -0.0064g^2(t) + 0.7017g(t) + 0.4657, & 0.8 \le \gamma^{-1}g(t) < 5 \\ 0.6367g(t) + 0.6336, & \gamma^{-1}g(t) \ge 5 \end{cases} \quad (14)$$

Figure 5:
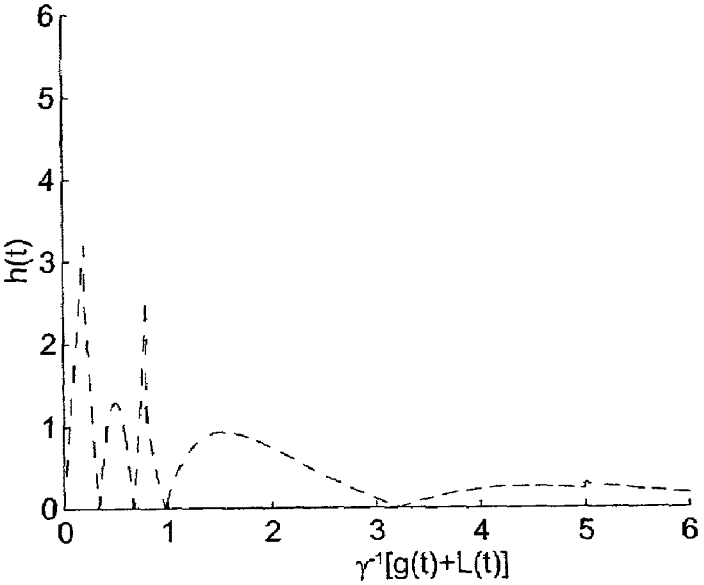
FIG. 5 is a graph illustrating percent error of the modeled representation depicted in FIG. 4.

FIG. 5 depicts the percent error of the modeled representation of the inverted demodulation function, as expressed in equation (12). As shown in FIG. 5, the model error is less than about 3%. It is noted that this error may be further reduced using additional segments or other approximation methods.

Figure 6:
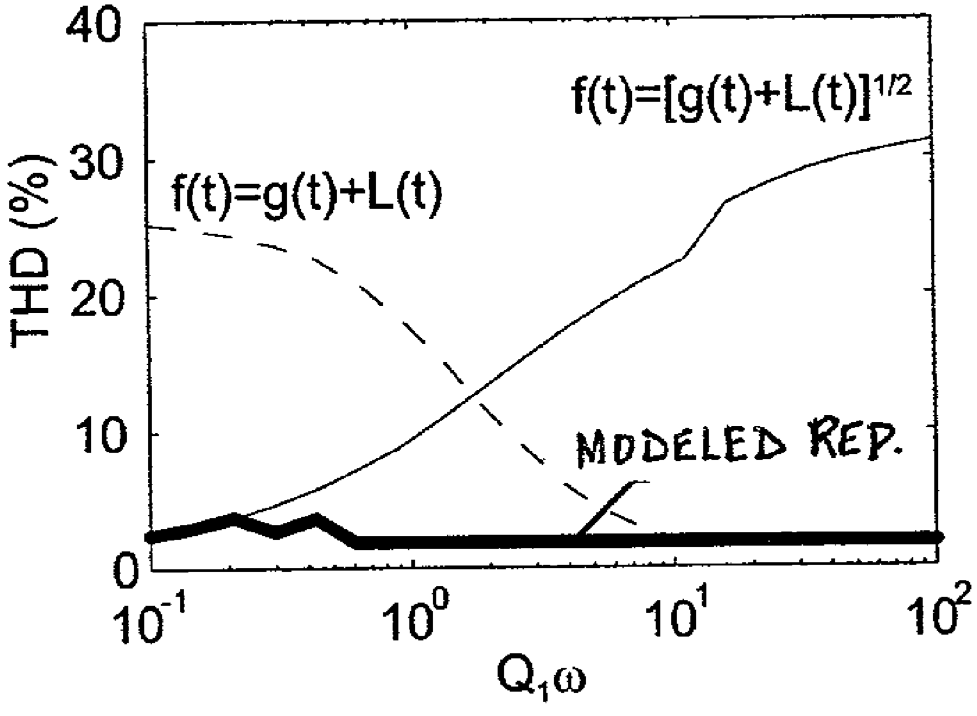
FIG. 6 is a graph illustrating total harmonic distortion of a synthesized 1 kHz tone after demodulation for the two (2) representative modulation envelopes corresponding to FIG. 2 and the modeled representation of FIG. 4.

FIG. 6 depicts the simulated THD resulting from the processing methods corresponding to equations (6), (8), and (14). As shown in FIG. 6, while the processing methods corresponding to equations (6) and (7) are accurate only for relatively small or large values of "$Q_1\omega$" (assuming "g(t)" is normalized), the processing method corresponding to the modeled representation of the inverted demodulation function, as expressed in equation (14), reduces distortion over a significantly wider range of "$Q_1\omega$" values.

It should be appreciated that the nonlinear processing methods of the above-described embodiments may be modified to include adjustments for other propagation mediums, environmental conditions (i.e., temperature and/or humidity either automatically detected or manually specified), listener range (either automatically detected or manually specified), content material (e.g., depending on signal characteristics or frequency content), and results of empirical listening tests. Additional approximation, with additional computational expense, may also be employed.

It is noted that, if desired, only small sections of the demodulation function or inverted demodulation function may be modeled. For example, if the values of "$Q_1\omega$" are expected to be small, but not small enough for simple square root processing to be sufficiently accurate, then adaptations of the above-described general methods may be used. For example, it may be desirable to model only a slight change of function curvature away from a simple square root.

It should be appreciated that similar nonlinear preprocessing methods may be used to compensate for the nonlinearity of the acoustic transducer 114 (see FIG. 1). These methods may also be combined with other algorithms that use equalization or other linear/nonlinear processing methods to further improve performance.

It is further noted that these nonlinear processing methods are applicable to other nonlinear acoustic applications such as beam-steered applications and non-directional parametric radiator applications. These nonlinear processing methods may also be used in water or any other propagation medium with appropriate changes in coefficient values.

It will further be appreciated by those of ordinary skill in the art that modifications to and variations of the above-described system and methods may be made without departing from the inventive concepts disclosed herein. Accordingly, the invention should not be viewed as limited except as by the scope and spirit of the appended claims.

What is claimed is:

1. A nonlinear acoustic system, comprising:

at least one audio signal source configured to provide at least one audio signal;

signal processing circuitry configured to receive the audio signal and process the audio signal using a modeled representation of a nonlinear inversion of an ultrasonic signal demodulation function, the modeled representation having an absolute error of less than approximately 10% for ultrasonic output levels ranging from approximately 20 Pa to at least approximately 1000 Pa;

a modulator configured to receive the processed signal and to convert the processed signal into ultrasonic frequencies; and at least one acoustic transducer configured to receive the converted signal and project the converted signal through a propagation medium along a selected path, thereby regenerating the audio signal along at least a portion of the selected path, wherein the ultrasonic signal demodulation function is expressed as $x \propto y\tanh(\gamma y)$, "x" denoting the regenerated audio signal, "y" denoting the processed audio signal, and "$\gamma$" denoting a coefficient primarily depending on the converted signal output level.

2. A nonlinear acoustic system, comprising:

at least one audio signal source configured to provide at least one audio signal;

signal processing circuitry configured to receive the audio signal and process the audio signal using a modeled representation of a nonlinear inversion of an ultrasonic signal demodulation function, the modeled representation having an absolute error of less than approximately 10% for ultrasonic output levels ranging from approximately 20 Pa to at least approximately 1000 Pa;

a modulator configured to receive the processed signal and to convert the processed signal into ultrasonic frequencies; and at least one acoustic transducer configured to receive the converted signal and project the converted signal through a propagation medium along a selected path, thereby regenerating the audio signal along at least a portion of the selected path, wherein the ultrasonic signal demodulation function is expressed as $x \propto y\tan^{-1}(\gamma y)$, "x" denoting the regenerated audio signal, "y" denoting the processed audio signal, and "$\gamma$" denoting a coefficient primarily depending on the converted signal output level.

3. The system of claim 2 wherein the modeled representation used by the signal processing circuitry to process the audio signal comprises a nonlinear inversion of a modeled representation of the ultrasonic signal demodulation function.

4. The system of claim 2 wherein the shape of the modeled representation of the nonlinear inversion of the ultrasonic signal demodulation function is dependent upon the level of the ultrasonic signal or the regenerated audio signal.

5. The system of claim 2 wherein the modeled representation of the nonlinear inversion of the ultrasonic signal demodulation function comprises a smooth, continuous curve that transitions from a square root function for low signal levels and asymptotically progresses to a linear function for high signal levels.

6. The system of claim 2 wherein the modeled representation of the nonlinear inversion of the ultrasonic signal demodulation function comprises an approximation selected from the group consisting of a polynomial, a spline, and a lookup table.

7. A method of generating audible sound by ultrasonic demodulation, comprising the steps of:

providing at least one audio signal;

processing the audio signal using a modeled representation of a nonlinear inversion of an ultrasonic signal demodulation function, the modeled representation having an absolute error of less than approximately 10% for ultrasonic output levels ranging from approximately 20 Pa to at least approximately 1000 Pa;

converting the processed signal into ultrasonic frequencies; and projecting the converted signal through a propagation medium along a selected path to regenerate the audio signal by ultrasonic demodulation along at least a portion of the selected path, wherein the processing step includes processing the audio signal using a modeled representation of a nonlinear inversion of an ultrasonic signal demodulation function expressed as $x \propto y \tanh(\gamma y)$, "x" denoting the regenerated audio signal, "y" denoting the processed audio signal, and "$\gamma$" denoting a coefficient primarily depending on the converted signal output level.

8. A method of generating audible sound by ultrasonic demodulation, comprising the steps of:

providing at least one audio signal;

processing the audio signal using a modeled representation of a nonlinear inversion of an ultrasonic signal demodulation function, the modeled representation having an absolute error of less than approximately 10% for ultrasonic output levels ranging from approximately 20 Pa to at least approximately 1000 Pa;

converting the processed signal into ultrasonic frequencies; and projecting the converted signal through a propagation medium along a selected path to regenerate the audio signal by ultrasonic demodulation along at least a portion of the selected path, wherein the processing step includes processing the audio signal using a modeled representation of a nonlinear inversion of an ultrasonic signal demodulation function expressed as $x \propto y \tan^{-1}(\gamma y)$, "x" denoting the regenerated audio signal, "y" denoting the processed audio signal, and "$\gamma$" denoting a coefficient primarily depending on the converted signal output level.

9. The method of claim 8 wherein the processing step includes processing the audio signal using a nonlinear inversion of a modeled representation of the ultrasonic signal demodulation function.

10. The method of claim 8 further including the step of implementing the modeled representation of the nonlinear inversion of the ultrasonic signal demodulation function using a smooth, continuous curve that transitions from a square root function for low signal levels and asymptotically progresses to a linear function for high signal levels.

11. The method of claim 8 further including the step of implementing the modeled representation of the nonlinear inversion of the ultrasonic signal demodulation function using an approximation selected from a polynomial, a spline, and a lookup table.

* * * * *

UNITED STATES PATENT AND TRADEMARK OFFICE
CERTIFICATE OF CORRECTION

PATENT NO. : 7,062,050 B1
APPLICATION NO. : 09/794193
DATED : June 13, 2006
INVENTOR(S) : Frank Joseph Pompei It is certified that error appears in the above-identified patent and that said Letters Patent is hereby corrected as shown below:

Column 6, after line 6, please delete "Equation 10". Equation 10 should read as follows:

$$\gamma^{-1}\left[g(t)+L(t)\right]= \begin{matrix} h^{2}(t), h(t) \le \frac{\pi}{8} \\ 0.2863h^{2}(t)+0.6767h(t)-0.1793, \frac{\pi}{8} < h(t) < \frac{\pi}{2} \\ 0.0012h^{2}(t)+1.5487h(t)-0.9008, \frac{\pi}{2} < h(t) \le 4\pi \\ 1.56h(t)-1, h(t) > 4\pi \end{matrix} \quad (10)$$

Column 7, after line 15, please delete "Equation 14". Equation 14 should read as follows:

$$f(t) \propto h(t) \propto \begin{matrix} \sqrt{g(t)}, \gamma^{-1}g(t) < 0.2 \\ 0.6409g^{2}(t)+1.5323g(t)+0.1693, 0.2 \le \gamma^{-1}g(t) < 0.8 \\ -0.0064g^{2}(t)+0.7017g(t)+0.4657, 0.8 \le \gamma^{-1}g(t) < 5 \\ 0.6367g(t)+0.6336, \gamma^{-1}g(t) \ge 5 \end{matrix} \quad (15)$$

Signed and Sealed this
Twenty-first Day of June, 2011

David J. Kappos
*Director of the United States Patent and Trademark Office*